United States Patent
Kang et al.

(10) Patent No.: US 9,655,051 B2
(45) Date of Patent: *May 16, 2017

(54) METHOD FOR POWER SAVING IN WIRELESS LOCAL AREA NETWORK AND APPARATUS FOR THE SAME

(71) Applicant: LG ELECTRONICS INC., Seoul (KR)

(72) Inventors: Byeong Woo Kang, Anyang-si (KR); Dae Won Lee, Anyang-si (KR); Yong Ho Seok, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/251,858

(22) Filed: Aug. 30, 2016

(65) Prior Publication Data

US 2016/0374023 A1 Dec. 22, 2016

Related U.S. Application Data

(63) Continuation of application No. 14/866,195, filed on Sep. 25, 2015, now Pat. No. 9,439,149, which is a
(Continued)

(51) Int. Cl.
*H04W 52/02* (2009.01)
*H04B 7/0452* (2017.01)
(Continued)

(52) U.S. Cl.
CPC ...... *H04W 52/0235* (2013.01); *H04B 7/0452* (2013.01); *H04L 69/323* (2013.01);
(Continued)

(58) Field of Classification Search
CPC .................................................. H04B 7/0452
(Continued)

(56) References Cited

U.S. PATENT DOCUMENTS 8,634,336 B2* 1/2014 Kang .................. H04B 7/0452
370/311
8,953,510 B2* 2/2015 Kang .................. H04B 7/0452
370/311
(Continued)

FOREIGN PATENT DOCUMENTS

CN 1753384 A 3/2006
CN 101584229 A 11/2009
(Continued)

OTHER PUBLICATIONS

Kang et al. "PHY Power Saving Features for 11ac", IEEE 802.11-10/0785r1, Jul. 2010, slides 1-26.

*Primary Examiner* — Mark Rinehart
*Assistant Examiner* — Matthew Hopkins
(74) *Attorney, Agent, or Firm* — Birch, Stewart, Kolasch & Birch, LLP

(57) ABSTRACT

A method and a wireless apparatus for power saving in a wireless local area network are discussed. The method according to an embodiment includes receiving a frame including a signal field from a transmitting device. The signal field includes a number indicator and a power saving indicator. The number indicator indicates a number of spatial streams for a corresponding recipient, and the power saving indicator indicates that the transmitting device allows the wireless device to enter a doze state during a transmission opportunity (TXOP). The method further includes entering the doze state until the end of the TXOP if the power saving indicator indicates an allowance of entering the doze state during the TXOP, and the number of spatial streams to be received by the wireless device is equal to zero.

12 Claims, 8 Drawing Sheets

Related U.S. Application Data continuation of application No. 14/595,876, filed on Jan. 13, 2015, now Pat. No. 9,173,169, which is a continuation of application No. 14/104,969, filed on Dec. 12, 2013, now Pat. No. 8,953,510, which is a continuation of application No. 13/395,351, filed as application No. PCT/KR2011/005679 on Aug. 2, 2011, now Pat. No. 8,634,336.

(60) Provisional application No. 61/391,080, filed on Oct. 8, 2010.

(51) Int. Cl.
*H04L 29/08* (2006.01)
*H04W 74/08* (2009.01)
*H04W 84/12* (2009.01)

(52) U.S. Cl.
CPC ....... *H04W 52/02* (2013.01); *H04W 52/0212* (2013.01); *H04W 52/0219* (2013.01); *H04W 52/0222* (2013.01); *H04W 74/0808* (2013.01); *H04W 84/12* (2013.01); *Y02B 60/50* (2013.01)

(58) Field of Classification Search
USPC .......................................................... 370/311
See application file for complete search history.

(56) References Cited

U.S. PATENT DOCUMENTS

| | | | |
|---|---|---|---|
| 9,173,169 B2* | 10/2015 | Kang | H04B 7/0452 |
| 9,439,149 B2* | 9/2016 | Kang | H04B 7/0452 |
| 2004/0264428 A1 | 12/2004 | Choi et al. | |
| 2005/0018624 A1 | 1/2005 | Meier et al. | |
| 2006/0045035 A1* | 3/2006 | Liu | H04W 52/0229 370/311 |
| 2006/0079232 A1 | 4/2006 | Omori et al. | |
| 2006/0285526 A1 | 12/2006 | Jang et al. | |
| 2007/0058605 A1 | 3/2007 | Meylan et al. | |
| 2008/0095091 A1 | 4/2008 | Surineni et al. | |
| 2009/0310692 A1 | 12/2009 | Kafle et al. | |
| 2010/0029325 A1 | 2/2010 | Wang et al. | |
| 2011/0064040 A1 | 3/2011 | Kim et al. | |
| 2011/0103280 A1 | 5/2011 | Liu et al. | |
| 2011/0149822 A1 | 6/2011 | Sammour et al. | |

FOREIGN PATENT DOCUMENTS

| | | |
|---|---|---|
| JP | 2010-93613 A | 4/2010 |
| KR | 10-2005-003575 A | 1/2005 |
| KR | 10-2006-0131049 A | 12/2006 |
| WO | WO 2011/056790 A | 5/2011 |

* cited by examiner

METHOD FOR POWER SAVING IN WIRELESS LOCAL AREA NETWORK AND APPARATUS FOR THE SAME

CROSS REFERENCE TO RELATED APPLICATIONS

This Application is a Continuation of co-pending U.S. patent application Ser. No. 14/866,195 filed on Sep. 25, 2015, which is a Continuation of U.S. patent application Ser. No. 14/595,876 filed on Jan. 13, 2015 (now U.S. Pat. No. 9,173,169 issued on Oct. 27, 2015), which is a Continuation of U.S. patent application Ser. No. 14/104,969 filed on Dec. 12, 2013 (now U.S. Pat. No. 8,953,510 issued on Feb. 10, 2015), which is a Continuation of U.S. patent application Ser. No. 13/395,351 filed on Mar. 9, 2012 (now U.S. Pat. No. 8,634,336 issued on Jan. 21, 2014), which is filed as the National Phase of PCT/KR2011/005679 filed on Aug. 2, 2011, which claims the benefit under 35 U.S.C. §119(e) to U.S. Provisional Application No. 61/391,080 filed on Oct. 8, 2010, all of which are hereby expressly incorporated by reference into the present application.

BACKGROUND OF THE INVENTION

Field of the Invention

The present invention relates to a wireless local area network (WLAN) system, and more particularly, to a method for power saving of a station (STA) in a WLAN system.

Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

The WLAN system supports an active mode and a power save mode as an operation mode of a station (STA). The active mode implies an operation mode in which the STA operates in an awake state capable of transmitting and receiving a frame. On the other hand, the power save mode is supported for power saving of an STA which does not require the active state to receive the frame. An STA supporting the power save mode (PSM) can avoid unnecessary power consumption by operating in a doze mode when it is not a time duration in which the STA can access to its radio medium. That is, the STA operates in the awake state only for a time duration in which a frame can be transmitted to the STA or a time duration in which the STA can transmit the frame.

With the widespread use of a wireless local area network (WLAN) and the diversification of applications using the WLAN, there is a recent demand for a new WLAN system to support a higher throughput than a data processing rate supported by the IEEE 802.11n. A next generation WLAN system supporting a very high throughput (VHT) is a next version of the IEEE 802.11n WLAN system, and is one of IEEE 802.11 WLAN systems which have recently been proposed to support a data processing rate of 1 Gbps or higher in a medium access control (MAC) service access point (SAP).

The next-generation WLAN system supports the transmission of a Multi-User Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired non-AP STAs at the same time.

Accordingly, there is a need for a method for power saving to avoid unnecessary power consumption of a non-AP STA in a WLAN system supporting MU-MIMO transmission.

SUMMARY OF THE INVENTION

The present invention provides a method for power saving of a station (STA) in a wireless location area network (WLAN) supporting multi user-multiple input and multiple output (MU-MIMO).

In an aspect, a method of power saving in a wireless local area network is provided. The method, performed by a wireless device, includes acquiring TXOP(transmission opportunity) from access point(AP), the TXOP indicating an interval of time when the AP has the right to transmit at least one data block for multi user-multiple input multiple output (MU-MIMO) transmission, receiving a power saving indicator from the AP, the power saving indicator indicating whether the AP allows to enter doze state during the TXOP, and entering the doze state until the end of the TXOP if the power saving indicator indicates an allowance of entering the doze state.

The method may further include receiving a group identifier(ID) from the AP, the group ID identifying a group of recipients for the at least one data block.

The step of entering the doze state until the end of the TXOP may include determining whether the wireless device is a member of the group of recipients identified by the group ID and entering the doze state until the end of the TXOP if the power saving indicator indicate an allowance of entering the doze state and the wireless device is not the member of the group of recipients.

The data block may be physical layer convergence procedure(PLCP) protocol data unit(PPDU) comprising a VHT-SIGA field and a plurality of data units The VHT-SIGA field may include the group ID and the power saving indicator.

The method may further include receiving a number indicator indicating the number of spatial streams transmitted to each of the recipients for transmitting the at least one data block.

The step of entering the doze state until the end of the TXOP may include determining whether the wireless device is a member of the group of recipients identified by the group ID, determining the number of spatial stream transmitted to the wireless device if the wireless device is not the member of the group of recipients and entering the doze state until the end of the TXOP if the power saving indicator indicates an allowance of entering the doze state and the number of spatial streams transmitted to the wireless device is zero.

The data block may be physical layer convergence procedure(PLCP) protocol data unit(PPDU) comprising a VHT-SIGA field and a plurality of data units The VHT-SIGA field may include the group ID, the power saving indicator and the number indicator.

In another aspect, an wireless apparatus is provided. The apparatus includes a transceiver transmitting and receiving radio signal and a processor operationally coupled to the transceiver. The processor is configured for the steps of: acquiring TXOP(transmission opportunity) from access point(AP), the TXOP indicating an interval of time when the AP has the right to transmit at least one data block for multi user-multiple input multiple output(MU-MIMO) transmission; receiving a power saving indicator from the AP, the power saving indicator indicating whether the AP allows to enter doze state during the TXOP; and, entering the doze state until the end of the TXOP if the power saving indicator indicates an allowance of entering the doze state.

A non-access point (AP) station (STA) can perform power saving in a transmission opportunity (TXOP) according to a characteristic of a data frame transmitted from an AP and a transmission target non-AP STA group allocated by the AP.

In a method of operating a power save mode according to an embodiment of the present invention, an AP can receive an additionally transmitted data frame by selectively allowing an operation of a sleep mode within a TXOP of a non-AP STA if necessary, thereby improving an overall throughput of a wireless local area network (WLAN) system.

DETAILED DESCRIPTION OF THE EMBODIMENTS

Figure 1:
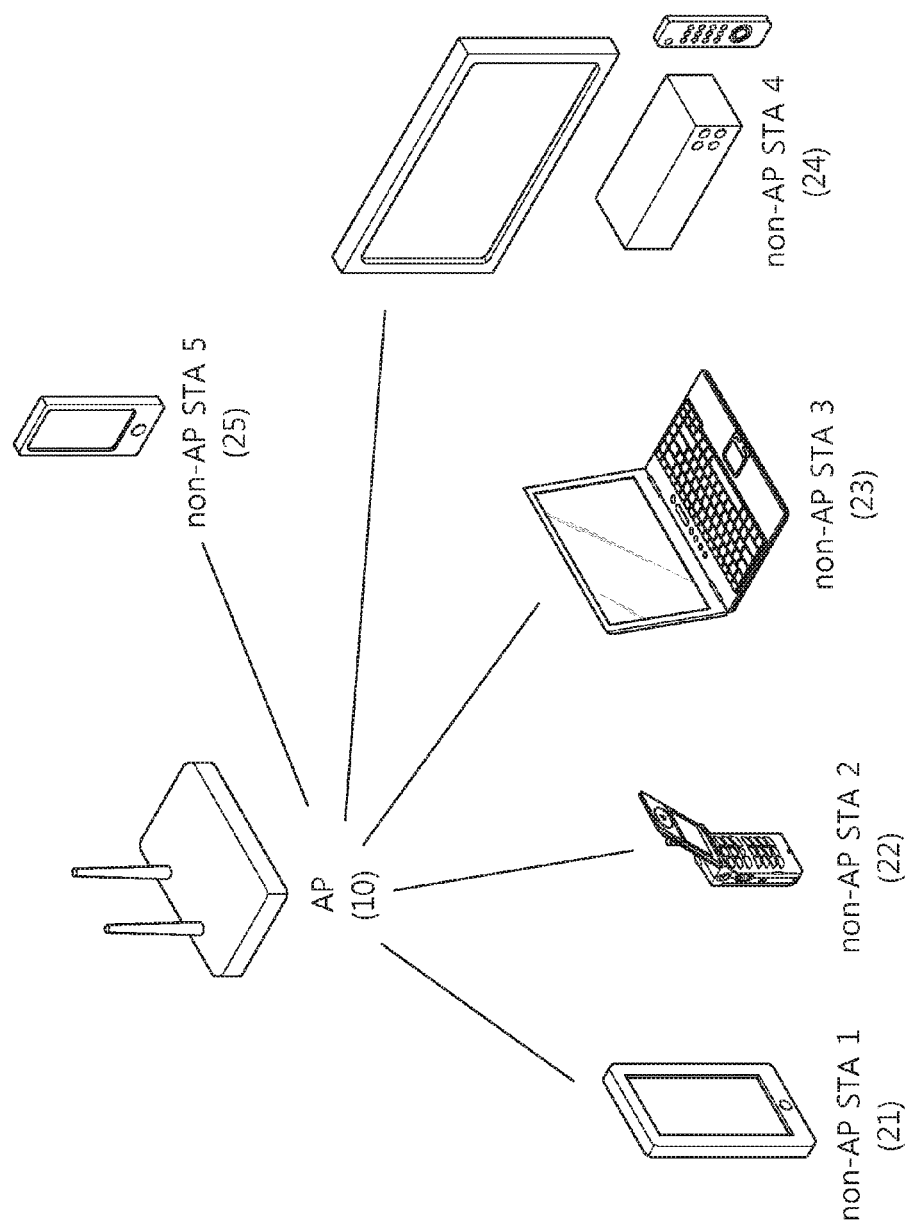
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to another terminology, such as a mobile terminal, a wireless device, a Wireless Transmit/Receive Unit (WTRU), User Equipment (UE), a Mobile Station (MS), a mobile subscriber unit, or a simply user.

An AP is a function medium, providing access to a DS via a radio medium, for an non-AP STA associated therewith. In an infrastructure BSS including an AP, communication between non-AP STAs is in principle performed via the AP. If a direct link is set up between the non-AP STAs, the non-AP STAs can directly communicate with each other. An AP may also be referred to another terminology, such as a central controller, a Base Station (BS), a node-B, a Base Transceiver System (BTS), or a site controller.

A plurality of infrastructure BSSs including the BSS shown in FIG. 1 may be interconnected through a Distribution system (DS). The plurality of BSSs interconnected through the DS is called an Extended Service Set (ESS). An AP and/or an non-AP STA included in the ESS can communicate with each other. In the same ESS, an non-AP STA can move from one BSS to another BSS while performing seamless communication.

In a WLAN system according to the IEEE 802.11 standard, a basic access mechanism for Medium Access Control (MAC) is a Carrier Sense Multiple Access with Collision Avoidance (CSMA/CA) mechanism. The CSMA/CA mechanism is also called the Distributed Coordination Function (DCF) of IEEE 802.11 MAC. This mechanism basically adopts a "listen before talk" access mechanism. According to this type of an access mechanism, an AP and/or an non-AP STA senses a radio channel or a medium before starting transmission. If, as a result of the sense, the medium is determined to be in an idle state, the AP and/or the non-AP STA starts sending a frame through the medium. If, as a result of the sense, the medium is determined to be in an occupied state, the AP and/or the non-AP STA does not start transmission and sets delay time for accessing the medium and waits.

The CSMA/CA mechanism includes virtual carrier sensing in addition to physical carrier sensing in which an AP and/or a STA directly senses a medium. Virtual carrier sensing is for supplement a problem that may be generated when accessing a medium, such as a hidden node problem. For the virtual carrier sensing, the MAC layer of a WLAN system employs a Network Allocation Vector (NAV). The NAV is a value in which an AP and/or a STA now using a medium or having rights to use the medium instructs another AP and/or another STA to use the time remaining until the medium becomes available. Accordingly, the value set as the NAV corresponds to the period during which the use of the medium is scheduled by an AP or a STA or both which transmit a relevant frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

In the EDCA of the contention-based channel access scheme, frames having 8 kinds of user priorities are allowed for differential pieces of medium access. Each frame reaching the MAC layer from an upper layer has a specific user priority value, and the MAC header of each QoS data frame includes a user priority value.

In order to transmit the QoS data frame including the priorities, a QoS AP and/or a QoS STA implement 4 Access Categories (ACs). The user priority of a frame reaching the MAC layer is allocated one corresponding AC. Accordingly, if success is achieved in EDCA contention, an EDCA TXOP (transmission opportunity) is obtained. The TXOP is the time interval during which a specific STA has rights to initiate transmission through a radio medium. The TXOP is used to allocate some time during which a specific AP or a specific STA or both can transmit a frame and to guarantee the transmission of the frame. The transmission start time and the maximum transmission time of the TXOP are determined by an AP. In case of the EDCA TXOP, an STA may be informed of the TXOP through a beacon frame.

An EDCA parameter set (i.e., the core element of the EDCA scheme) is a field indicative of parameters for the traffic of a user priority. For example, the EDCA parameter set may be given as listed in Table 1. For the EDCA parameter set, reference can be made to Paragraph 7.3.2.29 of "IEEE 802.11n, Part 11: Wireless LAN Medium Access Control (MAC) and Physical Layer (PHY) Specifications, Amendment 5: Enhancements for Higher Throughput" disclosed on October 2009.

TABLE 1

| AC | CWmin | CWmax | AIFSN | TXOP limit |
|---|---|---|---|---|
| AC_BK | aCWmin | aCWmax | 7 | 0 |
| AC_BE | aCWmin | aCWmax | 3 | 0 |
| AC_VI | (aCWmin + 1)/2 − 1 | aCWmin | 2 | 3.008 ms |
| AC_VO | (aCWmin + 1)/4 − 1 | (aCWmin + 1)/2 − 1 | 2 | 1.504 ms |

Values, such as AIFSN[AC], CWmin[AC], and CWmax [AC] (i.e., the EDCA parameter set), may be carried on a beacon frame by an AP and may be informed to each STA. Basically, priorities become higher as the values AIFSN [AC] and CWmin[AC] are decreased. Accordingly, a greater band is used in a given traffic environment because channel access delay is shortened. As described above, a specific STA determines the transmission time based on the TXOP when starting transmission. An AP carries AIFSN[AC], CWmin[AC], and CWmax[AC] (i.e., EDCA parameters) and TXOP Limit[AC] (i.e., EDCA TXOP time) on a beacon frame and transfers the beacon frame to each STA.

The TXOP may be acquired by transmitting a probe response frame, exchanging an RTS (request to send) frame and a CTS (clear to send) frame, and transmitting a CTS to self frame. Information related to the TXOP may be broadcasted by an AP and may be included in EDCA parameter set information elements included in the above frames.

A power management (PM) mode of a non-AP STA is classified into an active mode and a power save (PS) mode in a WLAN system. Basically, the non-AP STA operates in the active mode. When operating in the active mode, the non-AP STA can operate in an awake state so that a frame can be received all the time.

When operating in the PS mode, the non-AP STA operates by transitioning between a doze state and the awake state. When operating in the doze state, the non-AP STA operates with minimum power, and does not receive a radio signal, including a data frame, transmitted from an AP. When operating in the doze state, the non-AP STA can enter the awake state to receive a selected beacon frame, to receive multicast/broadcast transmission that follows a received specific beacon frame, and to wait for a response for a PS-poll frame.

The non-AP STA can operate in the PS mode in a TXOP duration determined by the AP by transitioning between the awake state and the doze state. In the following description of the present invention, when the non-AP STA operates by transitioning between the awake state and the doze state in the TXOP duration, it is referred to as a TXOP PS mode. The TXOP denotes an interval of time when an STA has a right to access a radio medium for frame transmission. However, a frame is not continuously exchanged in the TXOP duration. Therefore, power saving of the STA can be achieved if the TXOP PS mode is supported.

Unlike in the existing WLAN system, in the next-generation WLAN system, a higher throughput is required. This is called a VHT (Very High Throughput). To this end, the next-generation WLAN system is intended to support the transmission of an 80 MHz channel bandwidth, a contiguous 160 MHz bandwidth, and a non-contiguous 160 MHz channel bandwidth or higher. Furthermore, for a higher throughput, the next-generation WLAN system provides an MU-MIMO (Multi User-Multiple Input Multiple Output) transmission scheme. In the next-generation WLAN system, an AP can transmit a data frame to one or more MIMO-paired non-AP STAs at the same time. In a WLAN system, such as that shown in FIG. 1, an AP 10 can transmit data to an non-AP STA group, including one or more non-AP STAs among the non-AP STAs 21, 22, 23, 24 and 30 associated the AP 10, at the same time. Here, the data transmitted to the non-AP STAs may be transmitted through different spatial streams. The data frame transmitted by the AP 10 may be called a PPDU (Physical Layer Convergence Procedure (PLCP) Protocol Data Unit) which is generated in the Physical Layer (PHY) of the WLAN system and transmitted.

In the examples of the present invention, it is assumed that a target transmission non-AP STA group MU-MIMO-paired with the AP 10 includes the non-AP STA1 21, the non-AP STA2 22, the non-AP STA3 23, and the non-AP STA4 24. In this case, data may not be transmitted to a specific non-AP STA of the target transmission non-AP STA group because a spatial stream is not allocated to the specific STA. Meanwhile, a non-AP STAa 30 may be associated with the AP 10, but it is assumed that the non-AP STAa 30 is not included in the target transmission non-AP STA group.

Figure 2:
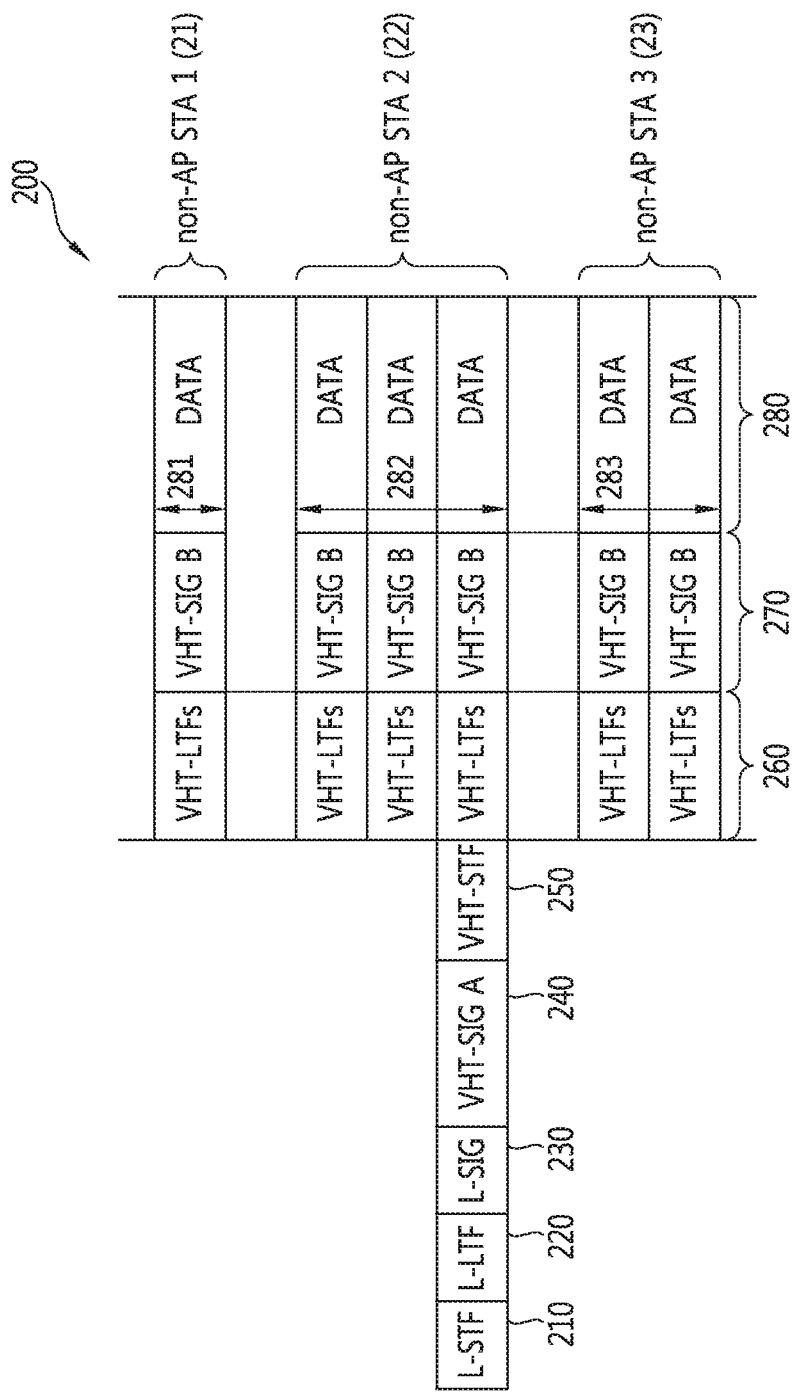
FIG. 2 is a block diagram showing an example of a format of a PPDU according to an embodiment of the present invention.

FIG. 2 is a block diagram showing an example of a format of a PPDU according to an embodiment of the present invention.

Referring to FIG. 2, the PPDU 200 may include an L-STF field 210, an L-LTF field 220, an L-SIG field 230, a VHT-SIG A field 240, a VHT-STF field 250, VHT-LTF fields 260, VHT-SIG B fields 270, and a data field 280.

A PLCP sublayer constituting the PHY layer adds necessary information to a PHY Service Data Unit (PSDU) received from an MAC (Medium Access Control) layer, converts the PSDU into the data field 280, generates the PPDU 200 by adding the L-STF field 210, the L-LTF field 220, the L-SIG field 230, the VHT-SIG A field 240, the VHT-STF field 250, the VHT-LTF fields 260, and the VHT-SIG B fields 270 to the data field 280, and transmits them to one or more non-AP STAs through a Physical Medium Dependent (PMD) sublayer constituting the PHY layer.

The L-STF field 210 is used for frame timing acquisition, Automatic Gain Control (AGC) convergence, coarse frequency acquisition, and so on.

The L-LTF field 220 is used to estimate a channel for demodulating the L-SIG field 230 and the VHT-SIG A field 240.

An L-STA(legacy station) uses the L-SIG field 230 to receive the PPDU 200 and to obtain data.

The VHT-SIG A field 240 is a field related to common control information necessary for non-AP STAs MIMO-paired with an AP. The VHT-SIG A field 240 includes control information for interpreting the received PPDU 200. The VHT-SIG A field 240 includes information about a spatial stream, bandwidth information, and ID information regarding whether each of a plurality of MIMO-paired non-AP STAs uses Space Time Block Coding (STBC) for each of the plurality of MIMO-paired non-AP STAs, a group identifier (i.e., ID information about a target transmission non-AP STA group), information about a spatial stream allocated to an non-AP STA included in a target transmission group non-AP STA indicated by a group identifier, and information related to a short Guard Interval (GI) of a target transmission non-AP STA. Here, the group identifier may include information regarding whether an MIMO transmission scheme now being used is an MU-MIMO transmission scheme or an single user(SU) MIMO transmission scheme.

The VHT-STF field 250 is used to improve the performance of AGC estimation in the MIMO transmission scheme.

The VHT-LTF fields 260 are used for an non-AP STA to estimate an MIMO channel. Since the next-generation WLAN system supports the MU-MIMO transmission scheme, the VHT-LTF fields 260 may be set as many as the number of spatial streams in which the PPDU 200 is transmitted. In addition, if full channel sounding is supported and performed, the number of VHT LTF fields may be increased.

The VHT-SIG B field 270 includes dedicated control information which is necessary for a plurality of MIMO-paired non-AP STAs to receive the PPDU 200 and to acquire data. Accordingly, only when the common control information included in the VHT-SIG A field 240 indicates that the PPDU 200 now received has been transmitted according to the MU-MIMO transmission scheme, a non-AP STA can be designed to receive the VHT-SIG B fields 270. On the other hand, if the common control information indicates that the PPDU 200 now received is for a single non-AP STA (including the SU-MIMO transmission scheme), a non-AP STA may be designed not to decode the VHT-SIG B fields 270.

The VHT-SIG B field 270 includes information about the modulation, encoding, and rate-matching of each non-AP STA. The size of the VHT-SIG B field 270 may be different according to the type (MU-MIMO or SU-MIMO) of MIMO transmission and a channel bandwidth used to transmit a PPDU.

The data fields 280 include data intended to be transmitted to a non-AP STA. The data field 280 include a service field for resetting a PLCP Service Data Unit (PSDU) to which a MAC Protocol Data Unit (MPDU) in the MAC layer has been transmitted and a scrambler, a tail field including a bit sequence necessary to return a convolution encoder to a zero state, and padding bits for standardizing the length of a data field.

Figure 3:
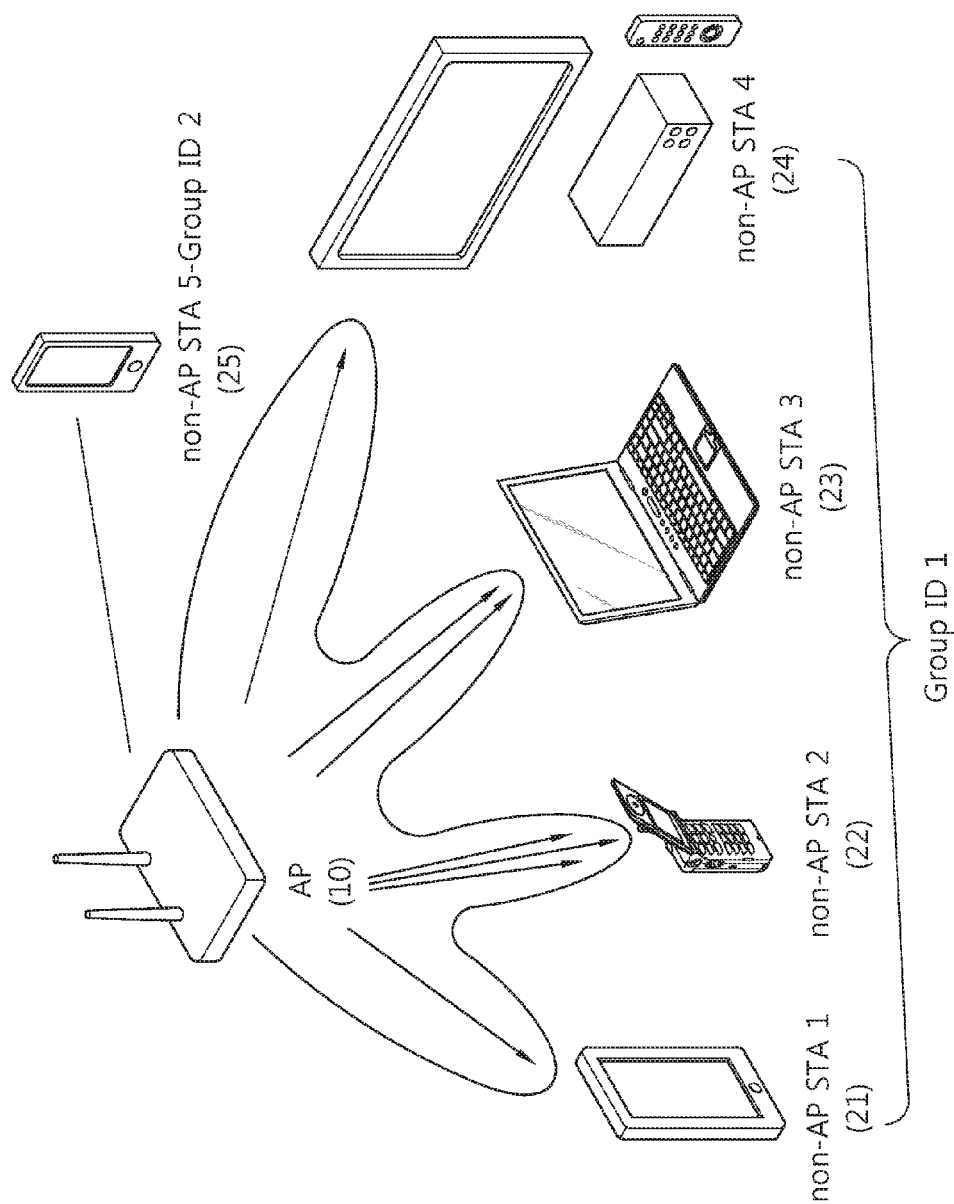
FIG. 3 shows an exemplary structure of a next generation WLAN system.

FIG. 3 shows an exemplary structure of a next generation WLAN system. The WLAN system of FIG. 3 includes an AP 10 and a plurality of non-AP STAs 21, 22, 23, 24, and 25 similarly to the example of FIG. 1. The AP 10 can transmit a PPDU to the plurality of non-AT STAs by using a MU-MIMO transmission scheme.

Referring to FIG. 3, it is assumed that the non-AP STA1 21, the non-AP STA2 22, the non-AP STA3 23, and the non-AP STA4 24 are included in a transmission target non-AP STA group indicated by a group identifier (ID) 1, and the non-AP STA5 25 is included in a transmission target non-AP STA group indicated by a group ID 2. In addition, it is also assumed that the AP 10 intends to transmit the PPDU to the non-AP STA included in the transmission target non-AP STA group indicated by the group ID 1.

The group ID 1 is included in a VHT-SIGA field 240 included in a PPDU 200 transmitted by the AP 10. A data field 281 transmitted to the non-AP STA1 21 is transmitted through one spatial stream. A data field 282 transmitted to the non-AP STA2 22 is transmitted through three spatial streams. A data field 283 transmitted to the non-AP STA3 23 is transmitted through two spatial streams. Meanwhile, although the non-AP STA4 24 is included in the transmission target non-AP STA group, there is no spatial stream transmitted for transmission of the data field. This is because although the AP 10 is able to perform MU-MIMO transmission with respect to a plurality of non-AP STAs which are MIMO-paired in a TXOP duration, there may be no data to be transmitted for some non-AP STAs. In this case, spatial stream information included in the VTH-SIGA field 240 can be configured to indicate that one spatial stream is transmitted to the non-AP STA1 21, three spatial streams are transmitted to the non-AP STA2 22, two spatial streams are transmitted to the non-AP STA3 23, and no spatial stream is transmitted to the non-AP STA 24.

Meanwhile, although the non-AP STA5 25 is associated with the AP 10, it is not the transmission target non-AP STA. While overhearing a PPDU 300, the non-AP STA5 25 can confirm the group ID included in the VHT-SIGA field 240 and thus can know that it is not the transmission target non-AP STA.

If it is not the transmission target non-AP STA in the above situation or if it is the transmission target non-AP STA but no spatial stream is allocated thereto, then unnecessary power consumption can be caused when the non-AP STA continuously operates in an awake state in a TXOP duration. For this, the non-AP STA can enter a doze state for power saving if it does not belong to the transmission target non-AP STA group indicated by the group indicator included in the PPDU transmitted by the AP or if no data is transmitted through a spatial stream even if it belongs to that group.

Meanwhile, if necessary, even the non-AP STA which does not receive data during a specific period in the TXOP duration may need to maintain the awake state instead of directly entering the doze state. For this, the AP may report whether to allow a TXOP PS mode of the non-AP STA in the TXOP duration according to a situation. As such, there is a need to discuss a method of power management of the non-AP STA in the TXOP duration in detail. Hereinafter, a data field transmitted to each non-AP STA can be referred to as a data unit, and a set of data units transmitted to a plurality of AP STAs can be referred to as a data block.

The group ID allocated by the AP may have two types. For example, a specific group ID set can be configured to allow an operation of the TXOP PS mode of the non-AP STA, and another specific group ID set can be configured not to allow the operation of the TXOP PS mode of the non-AP STA. The group ID set can be reported by the AP by transmitting a control signal to the non-AP STA on the basis of control information, or can be acquired by the non-AP STA through a capability exchange procedure between the AP and the non-AP STA. When a transmission target non-AP STA group is specified by using a group ID having such a characteristic, a non-AP STA capable of operating by entering the doze state in the TXOP duration can be distinguished from a non-AP STA operating in the awake state in the TXOP duration. An example of a method for power saving of a non-AP STA by using the two types of group IDs is shown in FIG. 4.

Figure 4:
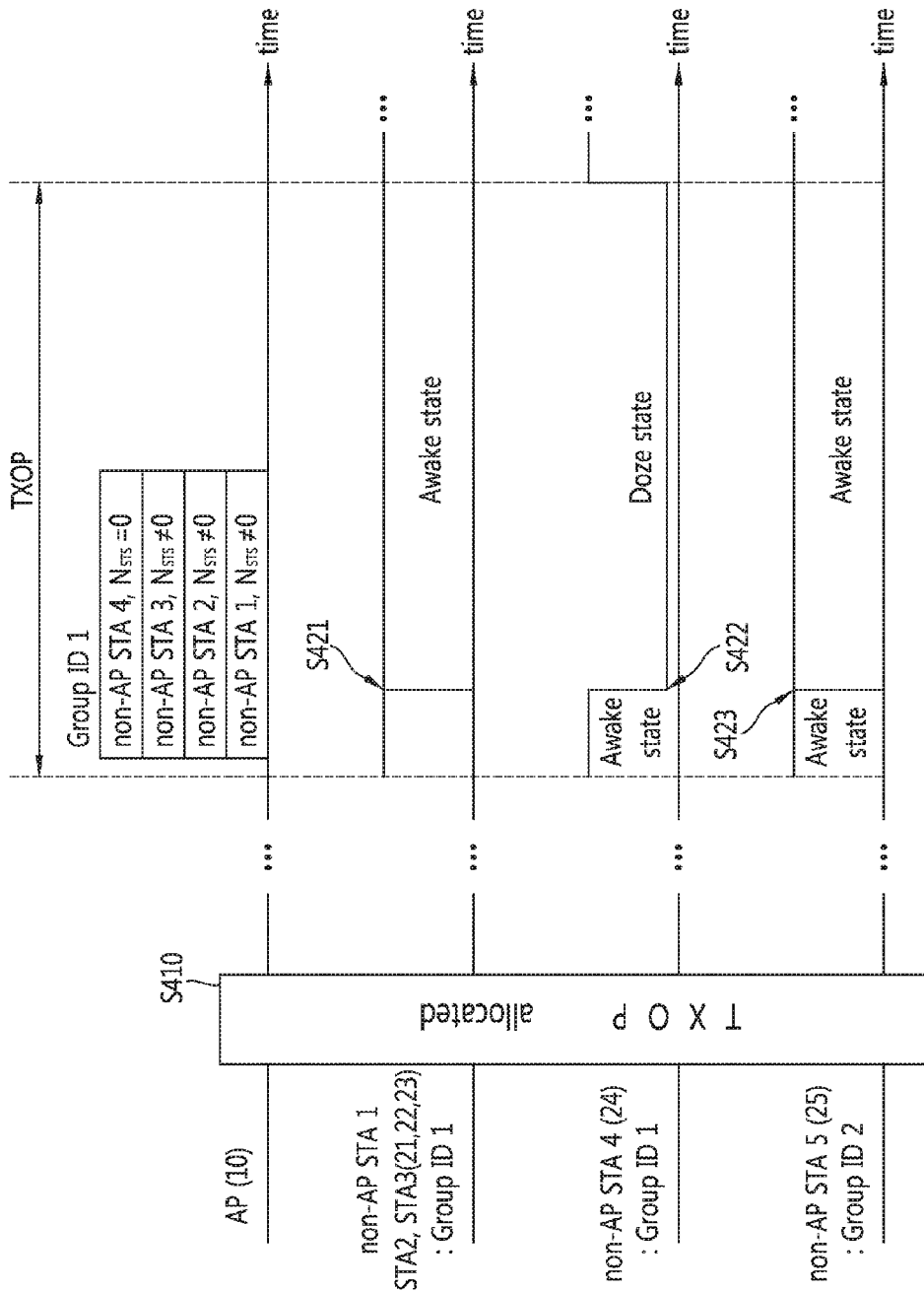
FIG. 4 shows an example of a method for power saving of a non-AP STA according to an embodiment of the present invention.

FIG. 4 shows an example of a method for power saving of a non-AP STA according to an embodiment of the present invention. In FIG. 4, a non-AP STA included in a group ID 1 is allowed to operate in a TXOP PS mode, and a non-AP STA included in a group ID 2 is not allowed to operate in the TXOP PS mode.

Referring to FIG. 4, a TXOP is allocated to non-AP STAs associated with an AP 10 (step S410). The TXOP allocation can be performed as described above in such a manner that information related to the TXOP acquired by the AP 10 is transmitted to the non-AP STAs.

The AP 10 transmits a PPDU, and the PPDU includes the group ID 1 as information indicating a transmission target non-AP STA group. However, a spatial stream for data transmission is not allocated to a non-AP STA4 24 (herein, NSTS=0).

A non-AP STA1 21, a non-AP STA2 22, and a non-AP STA3 23 can confirm that they are transmission target non-AP STAs by using the group ID after starting to receive the PPDU. In addition, these non-AP STAs can confirm the number of spatial streams allocated to them by using spatial stream information, and thus can know that data is transmitted to them. Therefore, the non-AP STA1 21, the non-AP STA2 22, and the non-AP STA3 23 continuously maintain an awake state in a TXOP duration (step S421).

After starting to receive the PPDU, the non-AP STA4 24 can confirm that it is a transmission target non-AP STA by using the group ID. However, spatial stream information is used to know that there is no spatial stream allocated to the non-AP STA4 24, and the non-AP STA4 24 can determine that receiving of the PPDU is no longer necessary. Since the group ID 1 indicating the transmission target non-AP STA group including the non-AP STA4 24 indicates a group for which the TXOP PS mode is allowed, the non-AP STA4 24 can operate by entering a doze state (step S422).

After starting to receive the PPDU, a non-AP STA5 25 can confirm that it is not a transmission target non-AP STA by using the group ID. However, since the group ID 2 indicating the transmission target non-AP STA group including the non-AP STA5 25 indicates a group for which the TXOP PS mode is not allowed, the non-AP STA5 25 cannot enter the doze state, and thus maintains the awake state (step S423).

Whether to allow an operation of the TXOP PS mode of the non-AP STA can be implemented by transmitting additional control information. This information is called TXOP PS mode indication information. The TXOP PS mode indication information can be included as control information of a MAC header, and can be transmitted to the non-AP STA through a capability exchange procedure between the AP and the non-AP STA. In addition, the TXOP PS mode indication information can be transmitted by being included in a VHT-SIGA field of the PPDU, and this can be implemented by allowing the VHT-SIGA field to further include a TXOP PS mode indication sub-field. If a value of the TXOP PS mode indication sub-field indicates '1', it can indicate that the TXOP PS mode of the non-AP STA is allowed, and if the value of the TXOP PS mode indication sub-field indicates '0', it can indicate that the TXOP PS mode of the non-AP STA is not allowed. The other way around is also possible for the sub-field value, and thus any specific value can be used as long as it is identifiable. The non-AP STA receives the PPDU and can operate by entering the doze state when the TXOP PS mode indicator indicates that the operation of the TXOP PS mode is allowed. This will be described in greater detail with reference to FIG. 5.

Figure 5:
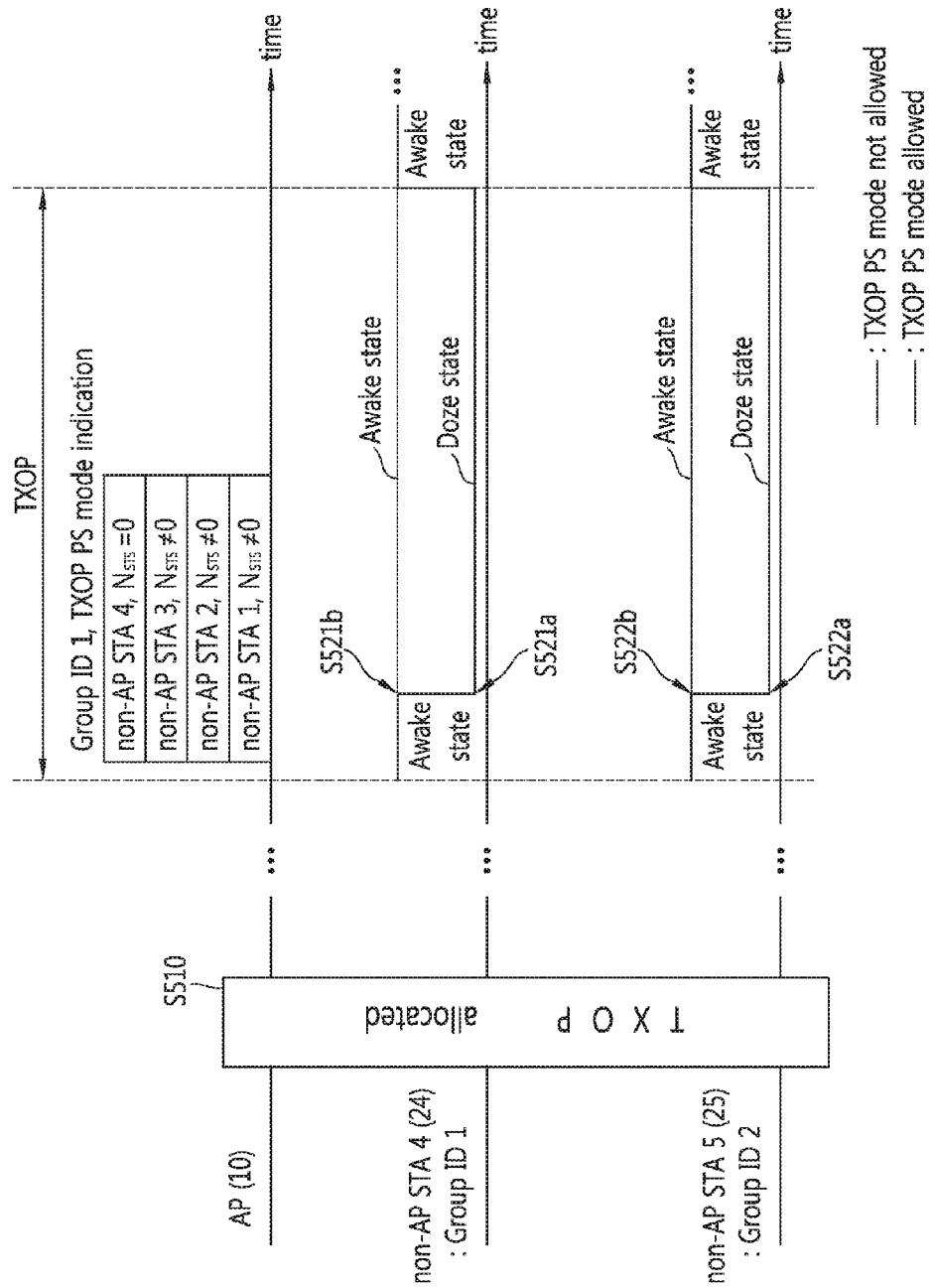
FIG. 5 shows another example of a method for power saving of a non-AP STA according to an embodiment of the present invention.

FIG. 5 shows another example of a method for power saving of a non-AP STA according to an embodiment of the present invention.

Referring to FIG. 5, a TXOP is allocated to non-AP STAs associated with an AP 10 (step S510). The TXOP allocation can be performed as described above in such a manner that information related to the TXOP acquired by the AP 10 is transmitted to the non-AP STAs.

The AP 10 transmits a PPDU, and the PPDU includes a group ID 1 as information indicating a transmission target non-AP STA group. However, a spatial stream for data transmission is not allocated to a non-AP STA4 24 (herein, NSTS=0). TXOP PS mode indication information is additionally included in the PPDU. The TXOP PS mode indicator information can indicate whether the TXOP PS mode is allowed or not allowed.

Although not shown, a non-AP STA1 21, a non-AP STA2 22, and a non-AP STA3 23 continuously maintain an awake state in a TXOP duration similarly to the example of FIG. 4.

After starting to receive the PPDU, the non-AP STA4 24 can confirm that it is a transmission target non-AP STA by using the group ID. However, spatial stream information is used to know that there is no spatial stream allocated to the non-AP STA4 24, and the non-AP STA4 24 can determine that receiving of the PPDU is no longer necessary. When the TXOP PS mode indication information indicates that the TXOP PS mode of the non-AP STA is allowed (as indicated by a solid line), the non-AP STA 24 can operate by entering a doze state (step S521*a*). On the contrary, when the TXOP PS mode indication information indicates that the TXOP PS mode of the non-AP STA is not allowed (as indicated by a dotted line), the non-AP STA 24 can continuously operate in the awake state in the TXOP duration (step S521*b*). After starting to receive the PPDU, a non-AP STA5 25 can determine that it is not a transmission target non-AP STA by using a group ID and can determine that receiving of the PPDU is no longer necessary. When the TXOP PS mode indication information indicates that the TXOP PS mode of the non-AP STA is allowed (as indicated by a solid line), the non-AP STA 25 can operate by entering the doze state (step S522*a*). On the contrary, when the TXOP PS mode indication information indicates that the TXOP PS mode of the non-AP STA is not allowed (as indicated by a dotted line), the non-AP STA5 25 can continuously operate in the awake state in the TXOP duration (step S522*b*).

Meanwhile, when the non-AP STA operates in the TXOP duration, the non-AP STA may not operate in the doze state until the end of the TXOP duration and can enter the awake state after a PPDU transmission duration.

Figure 6:
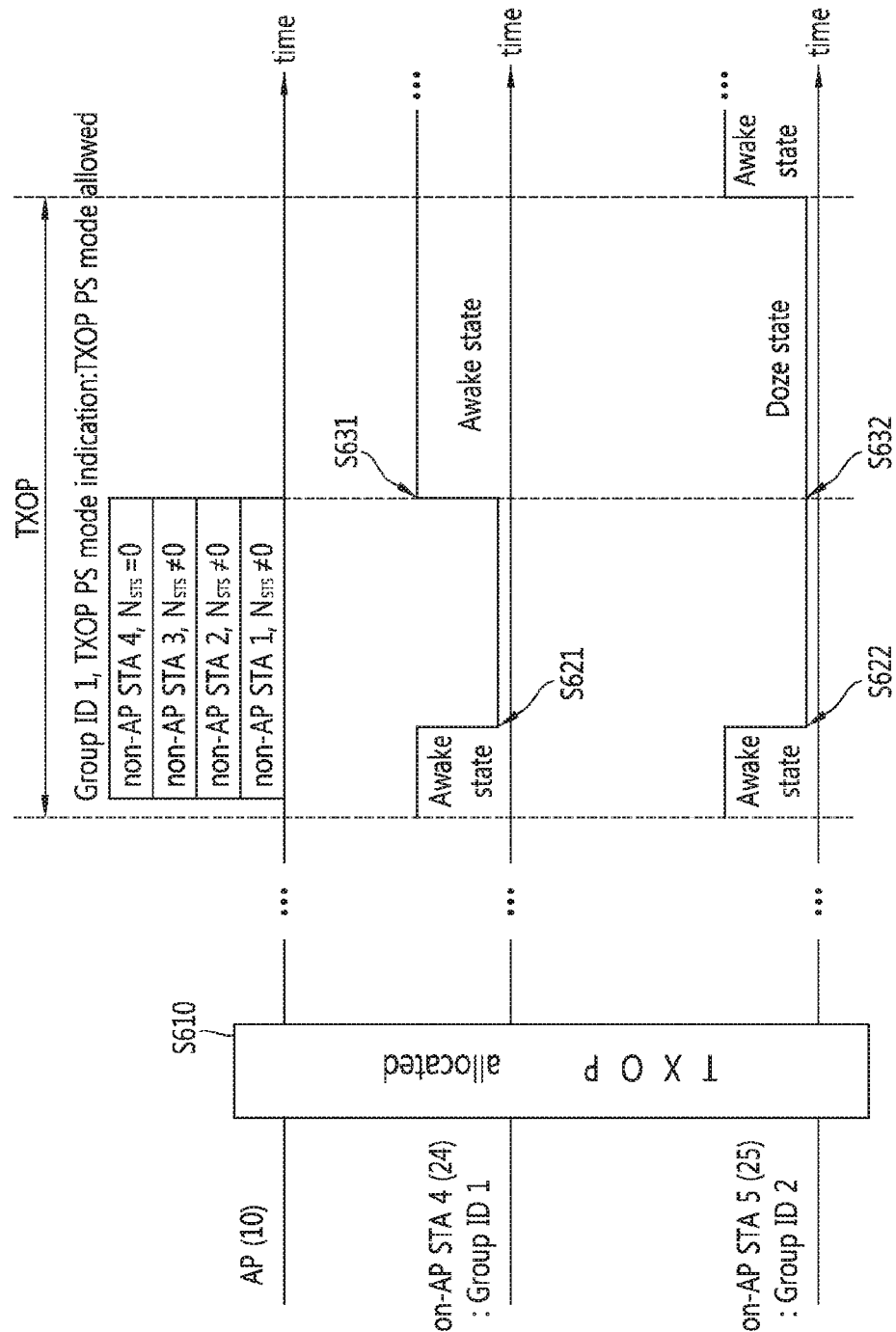
FIG. 6 shows another example of a method for power saving of a non-AP STA according to another embodiment of the present invention.

FIG. 6 shows another example of a method for power saving of a non-AP STA according to another embodiment of the present invention.

Referring to FIG. 6, a TXOP is allocated to non-AP STAs associated with an AP 10 (step S610). The TXOP allocation can be performed as described above in such a manner that information related to the TXOP acquired by the AP 10 is transmitted to the non-AP STAs.

After starting to receive a PPDU, a non-AP STA4 24 can confirm that it is a transmission target non-AP STA by using a group ID. However, spatial stream information is used to know that there is no spatial stream allocated to the non-AP STA4 24, and the non-AP STA4 24 can determine that receiving of the PPDU is no longer necessary. When TXOP PS mode indication information indicates that a TXOP PS mode of the non-AP STA is allowed, that is, when an operation of the TXOP PS mode is allowed, then the non-AP STA4 24 can operate by entering a doze state (step S621). The non-AP STA4 24 can operate by entering again an awake state upon completion of PPDU transmission of the AP 10 (step S631). The non-AP STA4 24 can know an end time of PPDU transmission by using PPDU length information which is control information included in the PPDU, length information of a data field, and number information indicating the number of orthogonal frequency division multiplexing (OFDM) symbols to be transmitted.

After starting to receive the PPDU, a non-AP STA5 25 can determine that it is not a transmission target non-AP STA by using a group ID and can determine that receiving of the PPDU is no longer necessary. When the TXOP PS mode indication information indicates that the TXOP PS mode of the non-AP STA is allowed, that is, when an operation of the TXOP PS mode is allowed, then the non-AP STA5 25 can operate by entering the doze state (step S622). However, the non-AP STA5 25 can operate by maintaining the doze state in a TXOP duration without entering a sleep mode even at the end of PPDU transmission (step S632).

In the embodiment of FIG. 6, the AP can selectively determine whether the non-AP STA is allowed to operate in the TXOP PS mode in the TXOP duration. This is usefully applicable when the PPDU is additionally transmitted during the TXOP. For example, the AP 10 further transmits the PPDU during the TXOP, and in this case, the PPDU cannot be received when the non-AP STA4 24 operates in the doze state in a situation where data is transmitted by transmitting a spatial stream to the non-AP STA4 24. On the other hand, if the AP 10 transmits information indicating that the operation of the TXOP PS mode is not allowed when transmitting a previous PPDU, the non-AP STA4 24 continuously operates in the awake mode, and thus can acquire data by receiving an additionally transmitted PPDU.

In addition, in a next generation WLAN system, a non-AP STA can be included in a duplicated manner in a transmission target non-AP STA group indicated by a group ID. For example, the non-AP STA4 24 can be included simultaneously to transmission target non-AP STA groups indicated by the group ID 1 and the group ID 2. When the non-AP STA4 24 operates in the awake state in a situation where the AP 10 intends to transmit data to the transmission target non-AP STA group indicated by the group ID 2, the data can be received correctly. Therefore, if the TXOP PS mode of the non-AP STA can be selectively allowed according to a situation during the TXOP, an overall throughput of the WLAN system can be improved.

Meanwhile, in the example of FIG. 6, the non-AP STA4 24 enters the awake state after the end time of PPDU transmission, and thus the PPDU can be received when the PPDU is transmitted by the AP 10 at a later time. However, since the non-AP STA5 25 continuously operates in a sleep mode in the TXOP duration, a PPDU additionally transmitted by the AP 10 at a later time cannot be received.

In addition, when transmitting the PPDU to the non-AP STA, the AP 10 can transmit the PPDU by further including indication information for indicating a duration time in which an operation the TXOP PS mode is continued in the TXOP duration. The TXOP PS mode duration indication information can be implemented by allowing a VHT-SIGB field of the transmitted PPDU to further include a TXOP PS duration indication sub-field.

Figure 7:
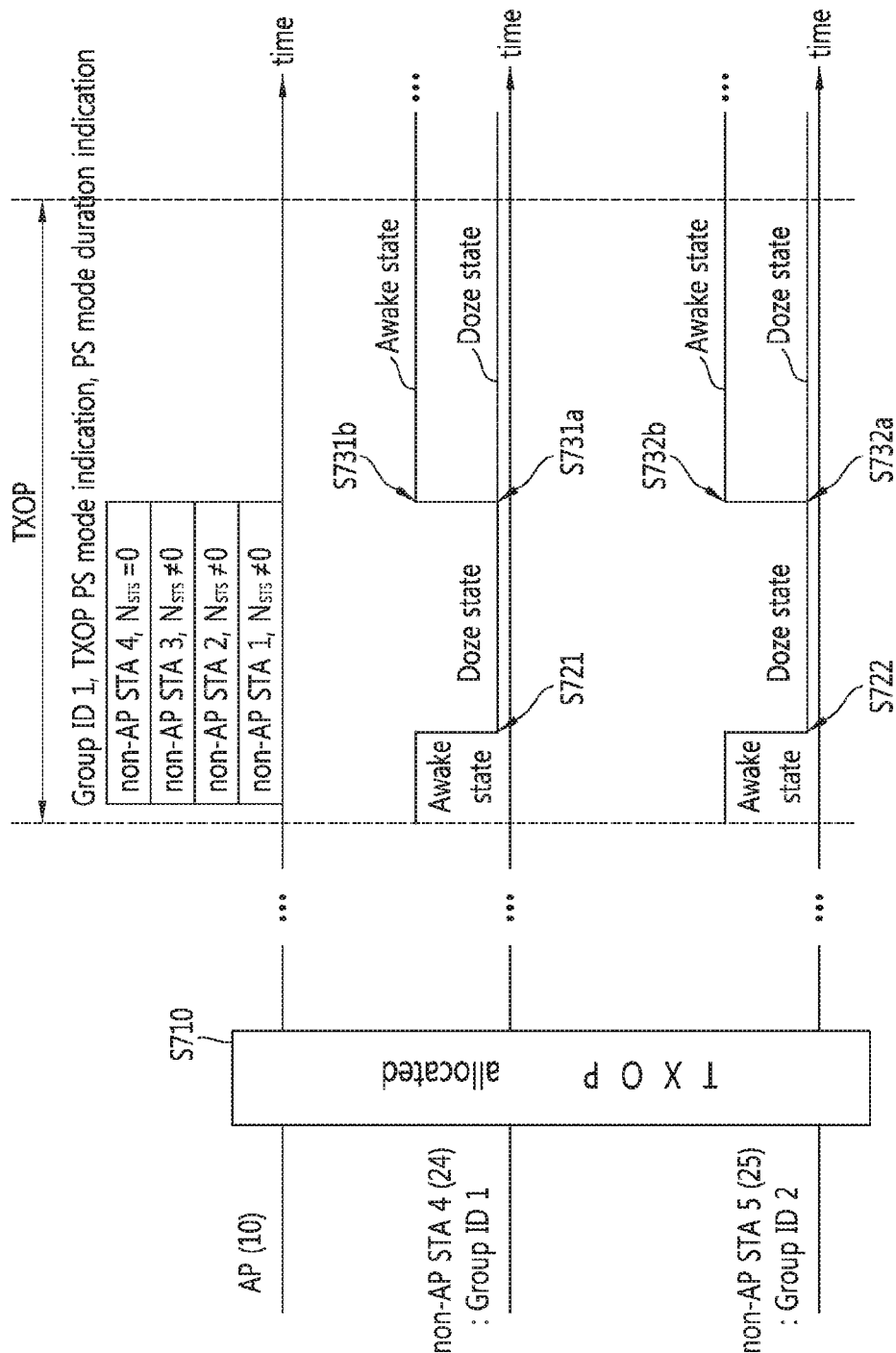
FIG. 7 shows another example of a method for power saving of a non-AP STA according to an embodiment of the present invention.

FIG. 7 shows another example of a method for power saving of a non-AP STA according to an embodiment of the present invention.

Referring to FIG. 7, a TXOP is allocated to non-AP STAs associated with an AP 10 (step S710). The TXOP allocation can be performed as described above in such a manner that information related to the TXOP acquired by the AP 10 is transmitted to the non-AP STAs.

After starting to receive a PPDU, a non-AP STA4 24 can confirm that it is a transmission target non-AP STA by using a group ID. However, spatial stream information is used to know that there is no spatial stream allocated to the non-AP STA4 24, and the non-AP STA4 24 can determine that receiving of the PPDU is no longer necessary. When TXOP PS mode indication information indicates that a TXOP PS mode of the non-AP STA is allowed, that is, when an operation of the TXOP PS mode is allowed, then the non-AP STA4 24 enters a doze state (step S721). If the TXOP PS duration indication information indicates that the TXOP PS mode has to be continued in the TXOP duration (as indicated by a dotted line), the non-AP STA4 24 maintains the doze state in a TXOP duration (step S731*a*). If the TXOP PS duration indication information indicates that the TXOP PS mode is continued until the end of PPDU transmission (as indicated by a solid line), then the non-AP STA4 24 can operate by entering an awake state at the end of PPDU transmission (step S731*b*).

After starting to receive the PPDU, a non-AP STA5 25 can determine that it is not a transmission target non-AP STA by using a group ID and can determine that receiving of the PPDU is no longer necessary. When the TXOP PS mode indication information indicates that the TXOP PS mode of the non-AP STA is allowed, that is, when an operation of the TXOP PS mode is allowed, then the non-AP STA5 25 can operate by entering the doze state (step S722). If the TXOP PS duration indication information indicates that the TXOP PS mode has to be continued in the TXOP duration (as indicated by a dotted line), the non-AP STA5 25 maintains the doze state in the TXOP duration (step S732*a*). If the TXOP PS duration indication information indicates that the TXOP PS mode is continued until the end of PPDU transmission (as indicated by a solid line), then the non-AP STA5 25 can operate by entering the awake state at the end of PPDU transmission (step S732b). When the PPDU is additionally transmitted by the AP in the TXOP duration, the non-AP STA4 24 and the non-AP STA5 25 may receive the PPDU or may operate again in the TXOP PS mode.

Figure 8:
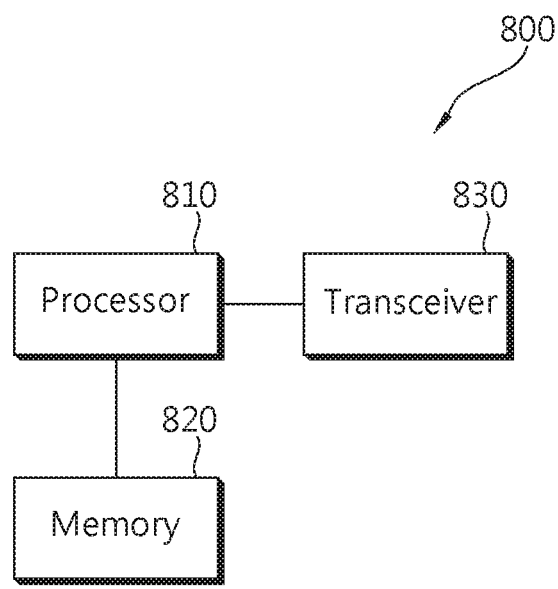
FIG. 8 is a block diagram showing a wireless apparatus according to the embodiments of the present invention may be implemented.

FIG. 8 is a block diagram showing a wireless apparatus according to the embodiments of the present invention may be implemented.

Referring to FIG. 8, the wireless apparatus 800 includes a processor 810, memory 820, and a transceiver 830. The transceiver 830 transmits and/or receives a radio signal and implements the physical layer of the IEEE 802.11 standard. The processor 810 is operatively coupled to the transceiver 830 and is set to implement the MAC layer or the PHY layer or both for implementing the embodiments of the present invention shown in FIGS. 2 to 7. The processor 810 determines a group ID in a received PPDU, the number of spatial streams. The processor 810 can determine whether operating in TXOP PS mode through TXOP PS mode indication information and operation mode in TXOP duration through TXOP PS duration indication information.

The processor 810 and/or the transceiver 830 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 820 and may be performed by the processor 810. The memory 820 may be located inside or outside the processor 810, and may be coupled to the processor 810 by using various well-known means.

What is claimed is:

1. A method of power saving in a wireless local area network, the method comprising:
   receiving, by a wireless device, a frame including a signal field from a transmitting device, wherein the signal field includes a number indicator and a power saving indicator, the number indicator indicates a number of spatial streams for a corresponding recipient, and the power saving indicator indicates that the transmitting device allows the wireless device to enter a doze state during a transmission opportunity (TXOP); and
   entering, by the wireless device, the doze state until the end of the TXOP if:
      the power saving indicator indicates an allowance of entering the doze state during the TXOP, and
      the number of spatial streams to be received by the wireless device is equal to zero.

2. The method of claim 1, wherein the frame includes a physical layer convergence procedure (PLCP) protocol data unit (PPDU).

3. The method of claim 2, wherein the signal field is a Very High Throughput (VHT) Signal-A (VHT-SIG-A) field.

4. The method of claim 1, wherein the wireless device is a non-access point (Non-AP) station.

5. The method of claim 1, wherein the signal field is commonly applied to a plurality of recipients when the frame is configured for the plurality of recipients.

6. The method of claim 1, wherein the power saving indicator is 1-bit information.

7. A wireless apparatus comprising:
   a transceiver configured to transmit and receive a radio signal; and
   a processor operatively coupled to the transceiver and configured to:
      receive a frame including a signal field from a transmitting device, wherein the signal field includes a number indicator and a power saving indicator, the number indicator indicates a number of spatial streams for a corresponding recipient, and the power saving indicator indicates that the transmitting device allows the wireless device to enter a doze state during a transmission opportunity (TXOP), and
      enter the doze state until the end of the TXOP if:
         the power saving indicator indicates an allowance of entering the doze state during the TXOP, and
         the number of spatial streams to be received by the wireless device is equal to zero.

8. The wireless apparatus of claim 7, wherein the frame includes a physical layer convergence procedure (PLCP) protocol data unit (PPDU).

9. The wireless apparatus of claim 8, wherein the signal field is a Very High Throughput (VHT) Signal-A (VHT-SIG-A) field.

10. The wireless apparatus of claim 7, wherein the wireless device is a non-access point (Non-AP) station.

11. The wireless apparatus of claim 7, wherein the signal field is commonly applied to a plurality of recipients when the frame is configured for the plurality of recipients.

12. The wireless apparatus of claim 7, wherein the power saving indicator is 1-bit information.

* * * * *